Aug. 7, 1934.  J. D. GRABILL  1,968,939
GRADING MACHINE FOR FRUITS AND VEGETABLES
Filed March 25, 1933  2 Sheets-Sheet 2
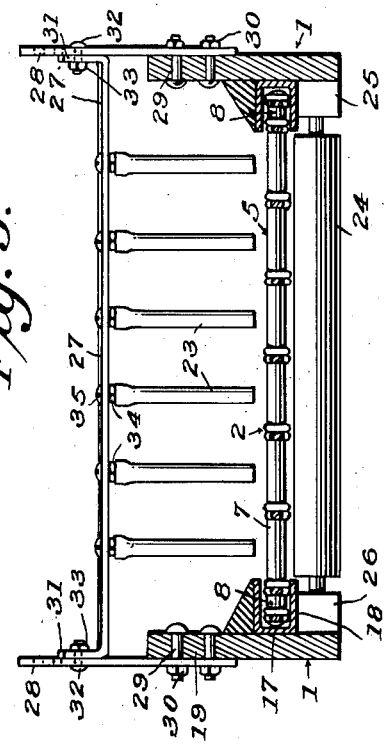
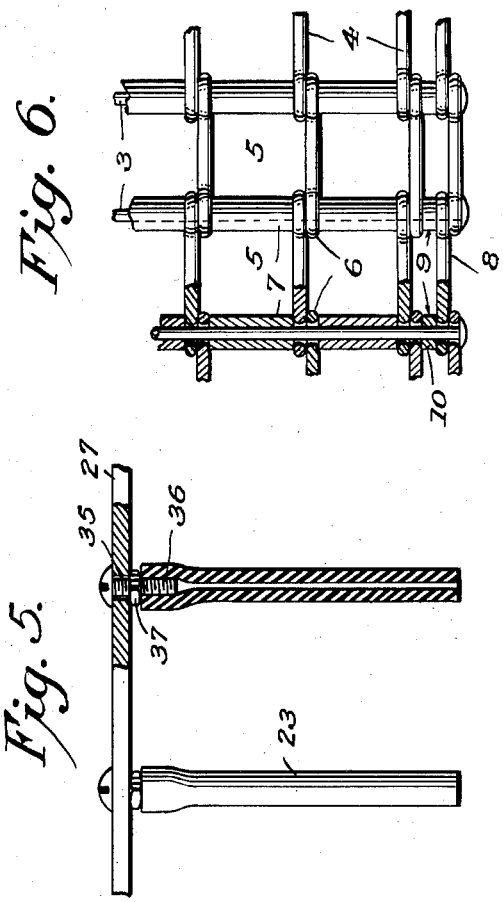
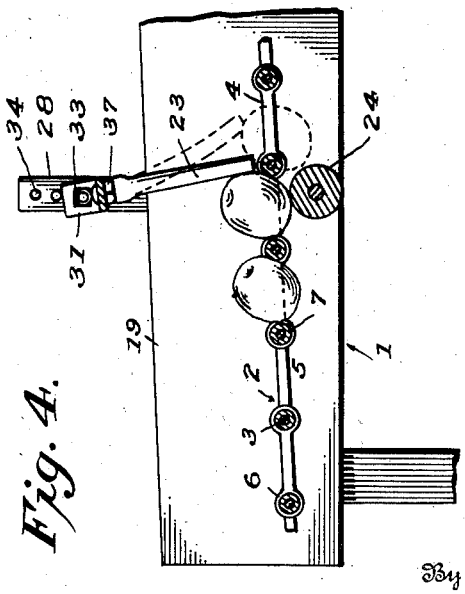
Inventor
JOHN D. GRABILL.
By Milans & Milans
Attorneys

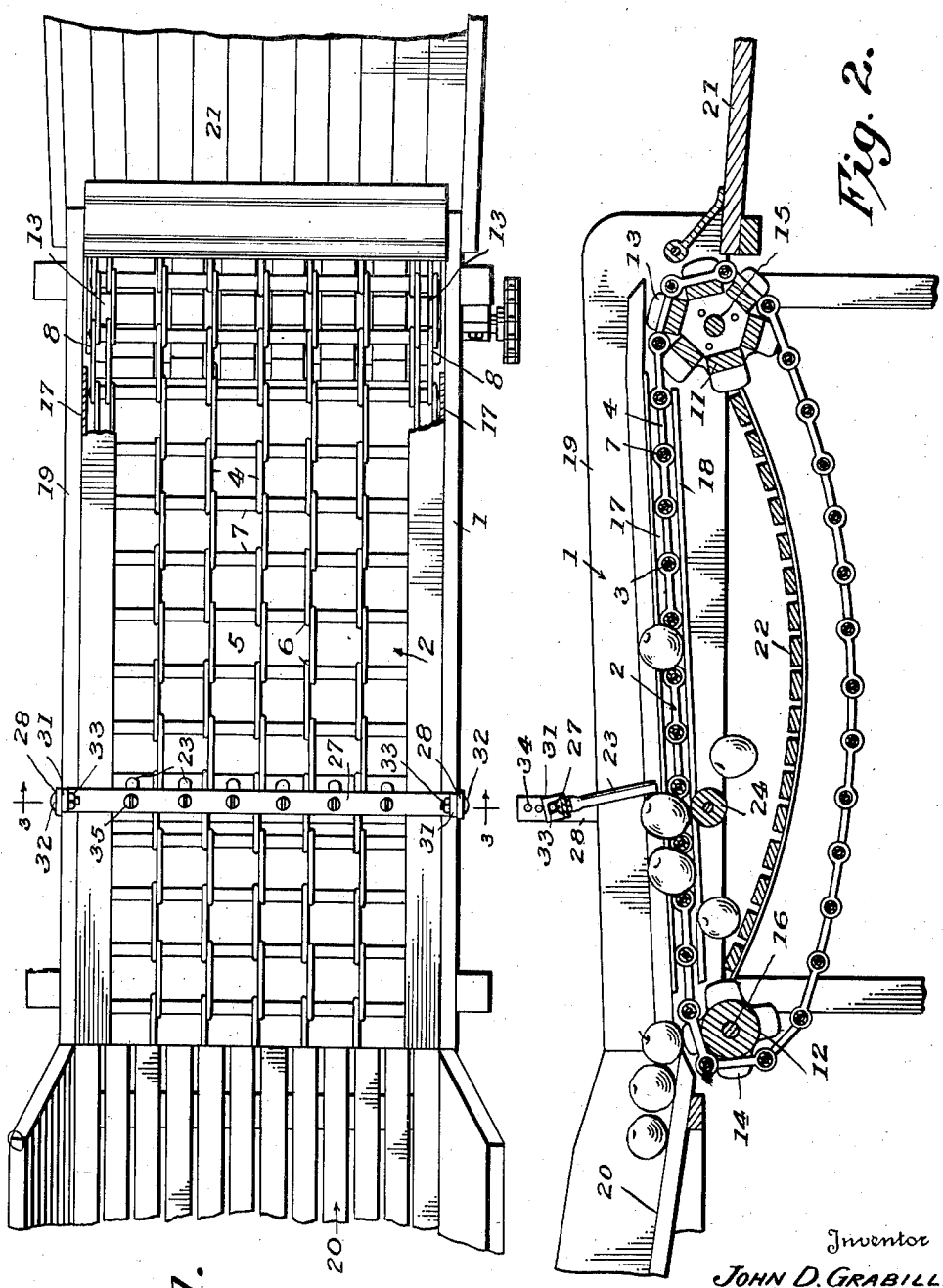

UNITED STATES PATENT OFFICE 1,968,939

GRADING MACHINE FOR FRUITS AND VEGETABLES

John D. Grabill, Woodstock, Va.

Application March 25, 1933, Serial No. 662,800

12 Claims. (Cl. 209—84)

This invention relates to improvements in grading machines for fruits and vegetables, especially apples. The present application is a continuation in part of my application Serial No. 528,624, filed April 8, 1931.

Objects of the invention are to provide an improved machine of the class referred to, to provide improved means for turning and positioning the fruit or vegetables while on the grading conveyor relatively to the sizing openings thereof to effect a more accurate, thorough and rapid grading of the material.

Another object of the invention is to provide improved means that will be efficient in turning and positioning the fruit or vegetables relatively to the sizing openings of the conveyor, that will also act to exert downward pressure upon the fruit or vegetables to assist the same to pass through the sizing openings when the same is properly positioned and of a size to pass therethrough, and that will not bruise or injure the fruit.

A further object of the invention is to provide improved article turning and positioning means of the character referred to that will be simple in construction, that can be manufactured at low cost, and that can be readily applied to the machine and easily adjusted relatively to the grading conveyor.

The invention, with other objects and advantages thereof, and the particular construction, combination and arrangement of parts comprising the same, will be understood from the hereinafter contained detailed description, when considered in connection with the accompanying drawings forming part hereof and illustrating one embodiment of the invention.

In the drawings:—

Figure 1 is a top plan view of a grading machine constructed in accordance with the present invention;

Figure 2 is a central longitudinal section;

Figure 3 is a section, on an enlarged scale, of the upper portion of the machine, on the line 3—3 of Figure 1, looking in the direction of the arrows;

Figure 4 is a detailed view, on an enlarged scale, of a portion of the grading conveyor and the article positioning means;

Figure 5 is a detail view of a portion of the article positioning means; and

Figure 6 is a detail view of a portion of the grading conveyor.

While a preferred embodiment of the invention is illustrated in the drawings, it will, of course, be understood that minor changes and modifications may be made in the particular construction shown, and the invention may be embodied in other forms as will appeal to those skilled in the art and falling within the scope of the appended claims, without departing from the spirit of the invention.

Referring to a detailed description of the particular embodiment of the invention illustrated in the drawings, 1 designates the main frame of the machine, which may be of any suitable construction. Mounted on the upper part of the frame 1 is a grading or sizing conveyor 2. In this particular exemplification of the invention, the grading conveyor 2 and its supporting and driving means, is shown as of the same construction as that shown in my Patent No. 1,715,197, dated May 28, 1929, only a single grading conveyor unit, however, being illustrated in the present instance.

The grading conveyor 2 comprises transverse rod members 3 and series of longitudinal link members 4 pivotally connected therewith and spaced to provide sizing openings 5. The transverse rod members 3 consist of stout metal rods circular in cross section and having smooth outer faces. The longitudinal link members 4 are circular in cross section and have eyes 6 at either end to engage the transverse rod members. On the transverse rod members 3 between the longitudinal link members 4 are cylindrical, tubular members or sleeves 7. The tubular members or sleeves 7 are rotatably mounted upon the transverse rod members between the longitudinal link members, said sleeves while serving as spacing means for the longitudinal link members are freely rotatably and function to prevent sticking or wedging of the fruit or vegetables in the grading openings 5 of the conveyor. At either side of the conveyor is a set of outer longitudinal link members 8 similar in construction to the link members 4 and pivotally connected to the transverse rod members 3 at the outer end portions thereof, said outer sets of link members 8 with the outermost of the series of link members 4, and the outer end portions of the transverse rod members 3 constituting outer marginal sections, designated 9, to cooperate with sprocket wheels. 10 designates spacing sleeves on the transverse rod members between the link members 8 and the outermost of the series of link members 4. The transverse rod members are provided at their ends with suitable retaining means.

The supporting and driving means for the grading conveyor 2 comprises a pair of rolls 11, 12 and sprocket wheels 13, 14, located at the ends of said rolls to cooperate with the side marginal sections 9 of the grading conveyor, said rolls and sprocket wheels being fixedly secured to shafts 15, 16, respectively, the shafts being mounted in suitable bearings on the frame 1. At either side of the supporting frame 1 are longitudinally extending slideways 17 between the pairs of sprocket wheels 13, 14, for the side sprocket wheel engaging portions 9 of the active stretch of the grading conveyor, the bottom boards 18 of said slideways constituting tracks upon which the side sections 9 of the conveyor 2 slide and are supported.

On the frame 1 are side boards 19 extending alongside the grading conveyor for holding the fruit or vegetables thereon. The machine is provided at its forward end with any suitable means for feeding the fruit or vegetables to the grading conveyor, an inclined chute or table 20 being shown for this purpose, and a receiving table 21 being shown at the discharge end of the conveyor. 22 designates an apron extending transversely of and below the upper stretch of the conveyor 2 to receive and convey fruit or vegetables that drop through the openings 5 of the conveyor, to one side of the machine. Any other suitable means may be employed in place of the apron 22.

In accordance with the present invention, means for turning and positioning the fruit or vegetables relatively to the sizing openings 5 of the conveyor, is provided comprising a plurality of resilient, bodily yieldable fingers 23 supported at one end above and depending adjacent the upper stretch of the grading conveyor 2 substantially centrally of the sides of the longitudinal series of sizing openings 5 of the conveyor, and a cooperating roller 24 disposed transversely of and directly below the upper stretch of the grading conveyor 2 and located beneath the fingers 23, said roller being adapted to engage fruit or vegetables that project from the sizing openings below the under face of the conveyor and lift the same relatively to the conveyor to be acted upon by the fingers 23. The roller 24, which is constructed of wood or other suitable material, is mounted to rotate freely in suitable bearings 25, 26, on opposite sides of the frame 1, the roller, as shown, being positioned so that the conveyor does not contact therewith, said roller turning when the fruit or vegetables contact therewith.

The fingers 23, are shown mounted on a bar 27 extending transversely above the grading conveyor 2 supported at opposite ends upon bars 28 extending upwardly from the side boards 19 and secured thereto by bolts and nuts 29, 30. The bar 27, which is preferably constructed of metal, has angularly disposed end portions 31 fitting against and clamped to the side bars 28 by bolts and nuts 32, 33, and the side bars 28 are each provided with a series of apertures 34 for the bolts 32, provision thus being made for the angular and vertical adjustment of the bar 27 on the side bars 28, and the angular and vertical adjustment of the fingers 23 relatively to the grading conveyor 2 to meet different conditions as when real large size fruit or vegetables or the smaller grades are being graded. The fingers 23 are preferably arranged, as shown, to extend rearwardly at a downward inclination. The fingers 23, which are round in cross section, are preferably constructed of rubber and formed tubular, the same being conveniently constructed from short lengths or sections of rubber tubing. The fingers 23 are secured at their upper end portions to the bar 27 through the medium of short projections 35 on said bar. The diameter of the short projections 35 is greater than the interior diameter of the rubber fingers 23, and said projections are provided on their outer faces with raised portions 36, preferably as shown, in the form of a spiral rib or thread, end portions of the rubber fingers 23 being screwed or forced on to the projections 35 to tightly grip and connect the fingers thereto, the raised portions or thread 36 of the projections 35 being embedded in the inner walls of the end portions of the fingers. As illustrated in the drawings, the projections 35 advantageously take the form of short bolts, extending through apertures in the bar 27 and being secured thereto by nuts 37. As will be understood the short projections or bolts 35 only extend a short distance into an end portion of the rubber fingers 23, the major portions of said fingers being left entirely free and resilient, the fingers being bodily yieldable or adapted to flex.

In the operation of the machine, the apples or other fruit or vegetables are fed to the inclined chute or table 20 on to the grading conveyor 2, the fruit or vegetables, which are small enough to pass through the sizing openings 5 of the conveyor, dropping through the sizing openings to the apron 22, and the fruit or vegetables that are too large to pass through the sizing openings of the conveyor, being carried to the receiving table 21.

The resilient fingers 23 depending adjacent the upper stretch of the conveyor intermediate the sides of the longitudinal series of sizing openings of the conveyor, exert a pushing and turning action upon the fruit or vegetables to change the position of the same relatively to the sizing openings so that its smallest diameter will be presented to the sizing openings.

Fruit or vegetables that extend partially through the openings of the conveyor will contact with the freely rotatable roller 24 and will be lifted thereby relatively to the conveyor, so that the same will be free to be turned by the fingers 23, said fingers acting when the fruit or vegetables are thus raised and freed from the conveyor by the roller 24, to turn the material. As will be understood, the freely rotatable sleeve members 7 on the transverse rod members 3 of the conveyor function to permit the fruit or vegetables that extend partly through the sizing openings while carried along on the conveyor to be easily pushed back or raised without crushing or injury to the upper side of the conveyor by the roller 24. Said sleeve members 7 also coact with the roller 24 in supporting the fruit or vegetables free of the conveyor to be easily turned by the fingers. The fingers, in addition to turning the fruit, also serve to separate the fruit or vegetables and prevent crowding at the sizing openings. If two pieces of fruit that are small enough to pass through the sizing openings get over the same opening, they are parted by the fingers and forced into proper position relatively to the sizing openings. The fruit or vegetables, which are too large to pass through the sizing openings of the conveyor push past the fingers 23, the resiliency of the fingers being such that they yield sufficiently under the greater pressure exerted thereupon by the larger pieces of fruit, to provide for this action.

It will be noted that the special construction and combination of parts hereinbefore set forth provides means that will operate to turn and position the fruit or vegetables relatively to the sizing openings of the grading conveyor to effect an accurate, thorough and rapid grading of the material without bruising or otherwise injuring the same.

The special article turning and positioning means is of a simple, practical nature, that can be produced at low cost, the same being adapted to be readily applied to various types of grading machines, and provision being made for the ready adjustment of the resilient fingers relatively to the conveyor to suit the different conditions incident to the grading of real large or the smaller grades of fruit and vegetables.

I claim:

1. In a fruit and vegetable grading machine, the combination with an endless travelling grading conveyor and supporting and driving means therefor, of means for turning and positioning the fruit or vegetables relatively to the grading openings of the conveyor when carried along thereon, said means comprising resilient fingers supported at one end above the upper stretch of the conveyor and depending adjacent the same in planes between the sides of the longitudinal series of grading openings, and a roller disposed transversely of the conveyor directly below the upper stretch thereof and located beneath the resilient fingers, said roller engaging the fruit or vegetables projecting below the underface of the conveyor from the grading openings and raising the same relatively to the conveyor.

2. In a fruit and vegetable grading machine, the combination with an endless travelling grading conveyor and supporting and driving means therefor, of means for turning and positioning the fruit or vegetables relatively to the grading openings of the conveyor when carried along thereon, said means comprising resilient fingers supported at one end above the upper stretch of the conveyor and depending adjacent the same in planes substantially centrally of the sides of the longitudinal series of grading openings, and a roller disposed transversely of the conveyor directly below the upper stretch thereof and located beneath the resilient fingers, said roller engaging the fruit or vegetables projecting below the underface of the conveyor from the grading openings and raising the same relatively to the conveyor.

3. In a fruit and vegetable grading machine, the combination with an endless travelling grading conveyor and supporting and driving means therefor, of means for turning and positioning the fruit or vegetables relatively to the grading openings of the conveyor when carried along thereon, said means comprising resilient fingers supported at one end above the upper stretch of the conveyor and depending adjacent the same in planes between the sides of the longitudinal series of grading openings, said fingers being rounded in cross section, and a roller disposed transversely of the conveyor directly below the upper stretch thereof and located beneath the resilient fingers, said roller engaging the fruit or vegetables projecting below the underface of the conveyor from the grading openings and raising the same relatively to the conveyor.

4. In a fruit and vegetable grading machine, the combination with an endless travelling grading conveyor and supporting and driving means therefor, of means for turning and positioning the fruit or vegetables relatively to the grading openings of the conveyor when carried along thereon, said means comprising resilient fingers supported at one end above the upper stretch of the conveyor and depending adjacent the same in planes between the sides of the longitudinal series of grading openings, said fingers being constructed of rubber, and a roller disposed transversely of the conveyor directly below the upper stretch thereof and located beneath the resilient fingers, said roller engaging the fruit or vegetables projecting below the underface of the conveyor from the grading openings and raising the same relatively to the conveyor.

5. In a fruit and vegetable grading machine, the combination with an endless travelling grading conveyor and supporting and driving means therefor, of means for turning and positioning the fruit or vegetables relatively to the grading openings of the conveyor when carried thereon, said means comprising bodily resilient fingers supported at one end above the upper stretch of the conveyor and depending adjacent the same in planes substantially centrally of the sides of the longitudinal series of grading openings of the conveyor, said fingers being of a width substantially less than the width of the grading openings.

6. In a fruit and vegetable grading machine, the combination with an endless travelling grading conveyor comprising transverse rod members and series of intermediate longitudinal link members pivotally connected therewith and spaced to provide grading openings, and sleeve members rotatably mounted on the transverse rod members between the longitudinal link members, and supporting and driving means for the conveyor, of means for positioning the fruit or vegetables relatively to the grading openings of the conveyor, said means comprising resilient fingers supported at one end above the upper stretch of the conveyor and depending adjacent the same in planes between the sides of the longitudinal series of grading openings of the conveyor.

7. In a fruit and vegetable grading machine the combination with an endless travelling grading conveyor comprising transverse rod members and series of intermediate longitudinal link members pivotally connected therewith and spaced to provide grading openings, and sleeve members rotatably mounted on the transverse rod members between the longitudinal link members, and supporting and driving means for the conveyor, of means for positioning the fruit or vegetables relatively to the grading openings of the conveyor, said means comprising resilient fingers supported at one end above the upper stretch of the conveyor and depending adjacent the same in planes between the sides of the longitudinal series of grading openings of the conveyor, and a roller disposed transversely of the conveyor below the upper stretch thereof and located beneath the said fingers, said roller engaging fruit or vegetables projecting below the underface of the conveyor from the grading openings and raising the same relatively to the conveyor.

8. In a fruit and vegetable grading machine, the combination with an endless travelling grading conveyor and supporting and driving means therefor, of means for turning and positioning the fruit or vegeables relatively to the grading openings of the conveyor when carried along thereon, said means comprising resilient fingers supported at one end above the upper stretch of the conveyor and depending at a rearward inclination adjacent the same in planes between the sides of the longitudinal series of grading openings, and a roller disposed transversely of the conveyor directly below the upper stretch thereof and located beneath the resilient fingers, said roller engaging the fruit or vegetables projecting below the under face of the conveyor from the grading openings and raising the same relatively to the conveyor.

9. In a fruit and vegetable grading machine, the combination with an endless travelling grading conveyor and supporting and driving means therefor, of means for turning and positioning the fruit or vegetables relatively to the grading openings of the conveyor when carried along thereon, said means comprising resilient, tubular, rubber fingers supported at one end above the upper stretch of the conveyor and depending adjacent the same in planes between the sides of the longitudinal series of grading openings, and a roller disposed transversely of the conveyor directly below the upper stretch thereof and located beneath the resilient fingers, said roller engaging the fruit or vegetables projecting below the under face of the conveyor from the grading openings and raising the same relatively to the conveyor.

10. In a machine of the class described, the combination with an endless travelling grading conveyor and supporting and driving means therefor, of means for turning and positioning the fruit or vegetables relatively to the grading openings of the conveyor when carried along thereon, said means comprising bodily resilient, rubber fingers supported at one end above the upper stretch of the conveyor and depending adjacent the same in planes between the sides of the longitudinal series of grading openings of the conveyor, said fingers being of a width substantially less than the width of the grading openings and being adapted to flex transversely and longitudinally of the grading openings.

11. In a fruit and vegetable grading machine, the combination with an endless travelling grading conveyor and supporting and driving means therefor, of means for turning and positioning the fruit or vegetables relatively to the grading openings of the conveyor when carried along thereon, said means comprising bodily resilient, tubular, rubber fingers supported at one end above the upper stretch of the conveyor and depending adjacent the same in planes substantially centrally of the sides of the longitudinal series of grading openings of the conveyor, said fingers being rounded in cross-section and being of a diameter substantially less than the width of the grading openings.

12. In a grading machine of the class described, the combination with an endless travelling grading conveyor and supporting and driving means therefor, of means for turning and positioning the fruit or vegetables relatively to the grading openings of the conveyor when carried along thereon, said means comprising a bar supported to extend transversely above the conveyor, said bar being provided with a series of bolt apertures along the same, bolts engaging the bolt apertures of the bar and projecting downwardly therefrom, nuts on the bolts clamping the same to the bar, and tubular, rubber fingers having an interior diameter less than the diameter of said bolts, each of the fingers having a relatively short end portion tightly fitting over a threaded end portion of one of the bolts and connecting the same therewith, the major portions of the fingers extending beyond the bolts and being bodily resilient, said fingers being rounded in cross-section and of a diameter substantially less than the width of the grading openings of the conveyor, and said fingers depending adjacent the conveyor in planes substantially centrally of the sides of the longitudinal series of grading openings thereof.

JOHN D. GRABILL.